Oct. 21, 1930.    O. P. DE REIGN    1,778,849
WOODWORKING MACHINE
Filed Feb. 16, 1929    2 Sheets-Sheet 1
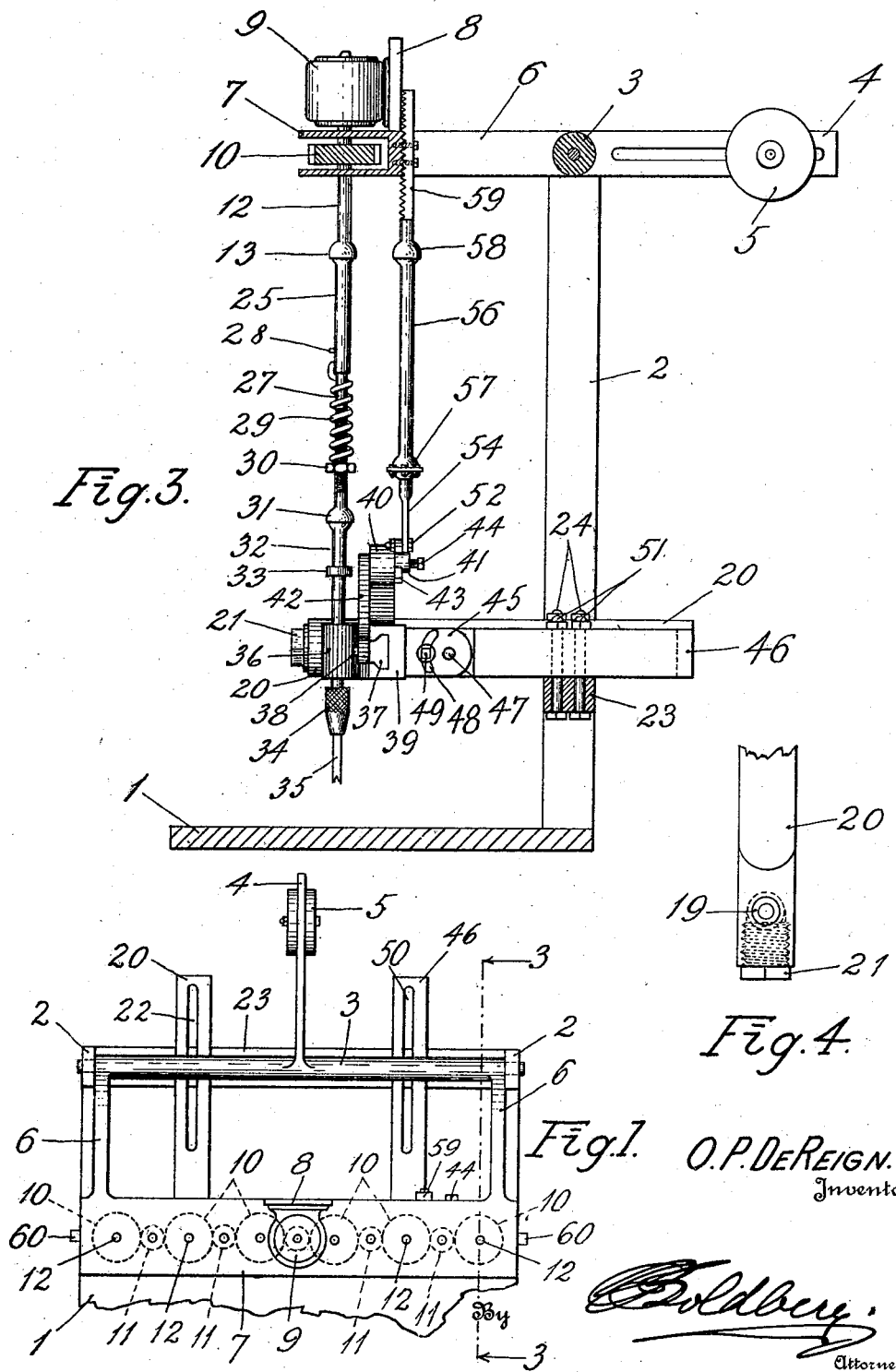

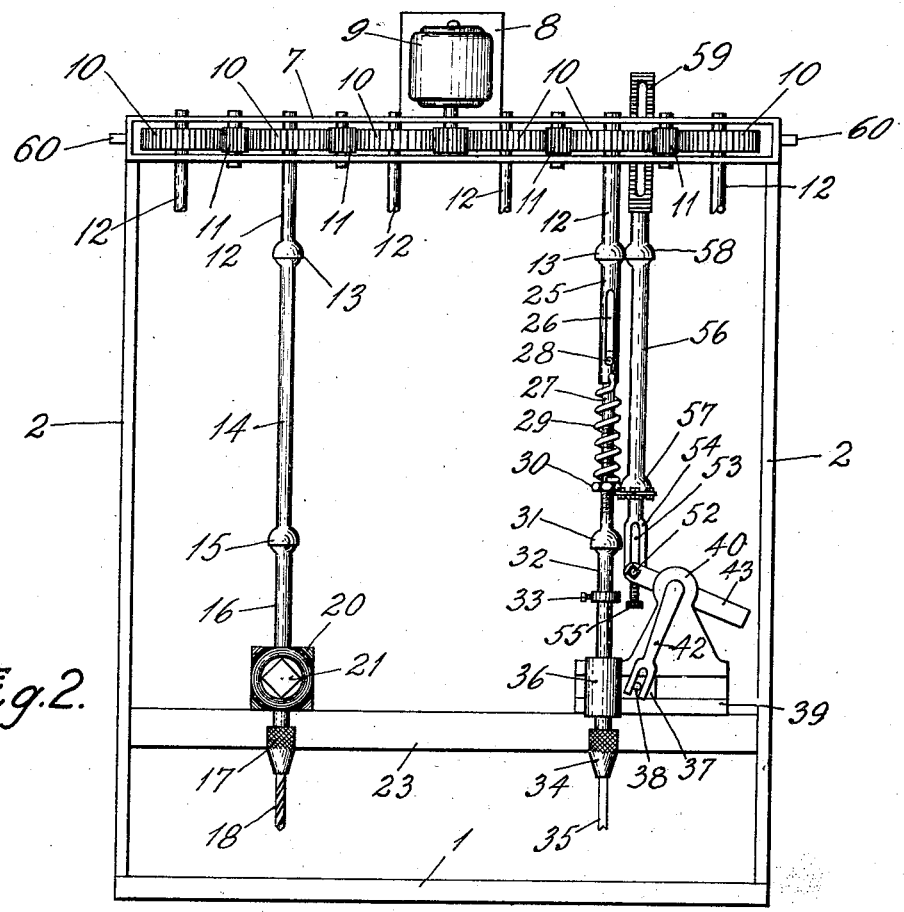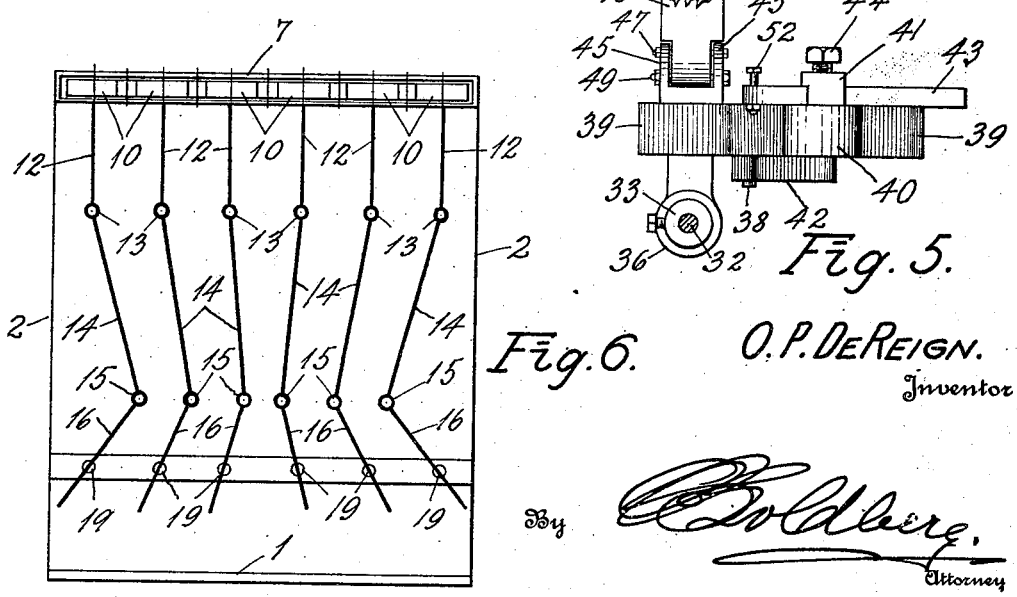

Patented Oct. 21, 1930

1,778,849

UNITED STATES PATENT OFFICE

OSCAR PERRY DE REIGN, OF LOS ANGELES, CALIFORNIA

WOODWORKING MACHINE

Application filed February 16, 1929. Serial No. 340,552.

My invention relates to woodworking machines in which one or more drills and one or more routing bits are attached to one train of gears and operated simultaneously by the same motor.

The objects of my invention are to provide furniture factories with a woodworking machine which will drill holes at any respectively required angle and at the same time cut groves also at any required angle.

Other objects are to provide a machine by means of which each hole and each groove may have its individual depth and each groove its individual length.

Other objects and advantages are to be found in the construction and arrangement of parts as will be described in the specification and particularly pointed out in the appended claims.

I attain these objects with the mechanism illustrated in the accompanying drawings in which:

Fig. 1 is a plan view with parts of the work table broken away.

Fig. 2 is a front view of Fig. 1.

Fig. 3 is a section through Fig. 1 along the line 3—3.

Fig. 4 is a detail of the drill stock guide.

Fig. 5 is a plan view of the routing assembly.

Fig. 6 illustrates diagrammatically a plurality of drills in various positions.

Similar numerals refer to similar parts throughout the several views.

In each rear corner of the work table 1 is an upright post 2. The upper ends of the posts 2 are connected by an axle 3 which is pivotally mounted in the posts 2. Extending from the middle of the axle 3 toward the rear is an arm 4 with a suitable counter weight 5. Extending from the end of the axle 3 toward the front are two arms 6 which support a gear case 7. Supported on the gear case 7 by a flange 8 is a motor 9. In the gear case 8 and driven by the motor 9, is a train of gears consisting of working gears 10 and idle pinions 11, the latter having essentially the purpose of giving all the working gears 10 a rotation in clockwise direction. Each working gear 10 carries a shaft 12 whose downwardly extending end terminates in a universal joint 13 and may operate either a drill or a routing bit.

If a drilling operation is to be performed the continuation from a universal joint 13 comprises a shaft 14, another universal joint, 15, a drill stock 16, a chuck 17 and a drill 18. The drill stock 16 is slidably mounted in a drill stock guide (Fig. 4) which consists of a perforated ball 19, mounted in a socket in the end of an arm 20, and held rigidly in adjusted position by a set screw 21. The other end of the arm 20 is slotted as shown at 22 in Fig. 1, rests on a bed plate 23 between the posts 2 and is rigidly held thereon by means of the bolts 24. By loosening the bolts 24, the arm can be shifted backward or forward, right or left.

If a grooving or routing operation is to be performed the continuation from the universal joint 13 consists of a tubular cylinder 25 with a longitudinal slot 26 therein, a plunger 27 in the tubular cylinder 25, with a pin 28 extending through the slot 26, a helical spring 29 around the plunger 27 pressing with one end against the tubular cylinder 25 and with the other end against an adjusting nut 30 on the plunger 27, another universal joint 31, a bit stock 32, a set collar 33 on the bit stock 32, a chuck 34, and a routing bit 35. The set collar 33 is preferably provided with a ball bearing or some other device to reduce friction when the set collar is pressed against the end of the head 36.

The bit stock 32 is guided by the routing assembly (Fig. 5) consisting of the aforementioned head 36 which is integrally attached to a slide 37; in which slide 37 is a pin 38. The slide moves laterally in the routing block 39, on top of which is a bearing 40. A large-headed gudgeon 41 rotates in the bearing 40. A fork 42 is rigidly affixed to the gudgeon 41 and engages the pin 38. The large head of the gudgeon 41 is traversed by an arm 42 which can be held in adjusted position by a screw 44. Extending rearwardly from the routing block 39 are two ears 45 which are pivoted to an arm 46 at 47. An arcuate slot 48 in each ear 45 and a bolt 49 in the arm 46 permit the routing assembly to be held rigidly in an upwardly or downwardly inclined position. The other end of the arm 46 is slotted as at 50, rests on the bed plate 23 and is rigidly affixed thereon by means of the bolts 51. By loosening the bolts 51, this arm 46 can also be shifted backward or forward, right or left.

The upper end of the arm 43 carries a pin 52 which engages a slot 53 in the bar 54. By means of an adjusting screw 55 (Fig. 2) in the bottom of the bar 54 the slot 53 can be lengthened or shortened. The connection between the bar 54 and the rod 56 consists of a ball and socket joint 57 which can be tightened so that the bar 54 and the rod 56 will act as a solid strut even though they should be set at an angle to each other. At the upper end of the rod 56 is a universal joint 58 and from thereon upward follows a slotted rack 59 which can be firmly secured to a serrated surface on the back of the gear case 7.

In operation the wood which requires working is placed on the work table 1. The drill stock 16 is set at the proper angle in the drill stock guide, and the arm 20 is shifted to set the drill 18 to the desired point on the wood. Then the routing assembly is tilted to the proper angle, the set collar 33 on the bit stock 32 is adjusted to the proper depth, the arm 43 in the gudgeon 41 is adjusted to carry the groove in the wood to its proper length, the slot 53 in the bar 54 is adjusted to cause the bit 35 to move laterally as soon as the set collar 33 touches the end of the head 36, the arm 46 is shifted to direct the bit 35 to the desired point in the wood, the ball and socket joint 57 is tightened, the motor 9 is started and the drill 18 and routing bit 35 are pressed into the wood preferably by means of a foot pedal (not shown) which may be attached to any convenient portion of the gear case 8 as for instance to the lugs 60 (Figs. 1 and 2).

The descent of the drill 18 will be equal to the downward movement of the gear case 8, the descent of the routing bit 35 however will be arrested as soon as the set collar 33 touches the head 36. Simultaneously the upper terminal of the slot 53 in the bar 54 will depress the arm 43 and, since the arm 43 and the fork 42 act as a bell crank the routing bit 35 will be moved in lateral direction through the required length of the groove in the wood. Upon release of the foot pedal the gear case 8 rises and returns drill 18 and routing bit 35 to their original positions.

The gear case 8 may of course be provided with any desired number of working gears 10, and each working gear may be equipped with a drill 18 to work at an individual angle as shown in Fig. 6. The same holds true for routing bits except that the angle of each routing bit is governed by the tilt of the routing assembly.

Having thus described my invention it will be seen that my objects have been accomplished, and though I have shown the preferred form of construction, I reserve to myself the right to make minor changes providing I do not contravene the spirit and principle of my invention.

I claim:

1. In a woodworking machine, the combination of a drill and a routing bit operated by the same train of gears and receiving the same amount of downward pressure, the downward movement on the drill remaining axial throughout the required distance, the downward pressure on the routing bit resolving itself into a movement first in an axial and then a lateral direction.

2. In a woodworking machine the combination of a work table, posts mounted on the work table, an axle between the posts, an arm extending rearwardly from the middle of the axle, a counterweight attached to the said arm, an arm extending forwardly from each end of the axle, a gear case supported by the forwardly extending arms, a motor on the gear case, a train of working gears in the gear case, a drill attached to one of said working gears and directed toward the work table, a routing bit attached to another one of said working gears and directed toward the work table, a serrated bar attached to the back of the gear case and giving an independent lateral movement to the routing bit, and universal connections between the working gear and a drill, between the working gear and the routing bit and between the serrated bar and the routing bit.

3. In a woodworking machine, the combination of a drill and a routing bit, a train of gears operating both drill and routing bit, a guide to direct the drill at any desired angle, a universal connection between the working gear and the drill, a routing assembly to direct the routing bit at any required angle and impart a lateral motion to the routing bit, and universal connection between the routing assembly, its respective working gear, and between the routing assembly and the back of the gear case.

4. In a woodworking machine the combination of a drill and a routing bit, said drill being guided by a ball and socket, a slotted arm supporting the ball and socket and directing the drill at any desired angle to any desired point within a horizontal circle, said routing bit being guided by a routing assembly, a slotted arm supporting the routing assembly and directing the routing bit to any desired point within a vertical arc, said drill and routing bit receiving the same amount of downward pressure, the pressure on the drill producing a movement in axial direction, the pressure on the routing bit producing a movement in axial direction until positively arrested and then by means of the routing assembly being transformed into a movement in lateral direction.

5. In a woodworking machine, the combination of a train of gears, a drill operated at any desired angle by said train of gears and at any desired point of work, universal connection between the drill and the train of gears, and a routing bit operated by the same train of gears, the connection between the routing bit and the train of gears including a tubular cylinder, a longitudinal slot in the cylinder, a plunger reciprocating in the cylinder, a pin in the plunger and projecting through the slot in the tubular cylinder, an adjusting nut on the plunger, a helical spring around the plunger between the adjusting nut and the tubular cylinder, universal joints in the cylinder and in the plunger and a set collar below the lower universal joint.

6. In a woodworking machine, the combination of a gear case, a train of gears in said gear case, a drill operated by the train of gears, a routing bit operated by the train of gears, and a routing assembly actuated by the gear case, said routing assembly comprising a head guiding the routing bit in vertical direction, a bell crank moving the routing bit in lateral direction, a slotted bar to actuate the bell crank at a predetermined moment, a rod connected to the bar by means of an adjustable ball and socket joint, a universal joint at the top of the rod and a serrated, slotted rack extending to the gear case and being firmly attached to the back of the gear case.

7. In a woodworking machine, the combination of a work table, posts on the work table, an axle between the posts, a counterbalanced gear case swingingly supported by the axle, a plurality of working gears in the gear case, a bit stock attached to each working gear, a telescoping and flexible connection between the bit stock and the working gear, and a guide for the bit stock, said guide comprising a routing block, a head mounted for laterally sliding motion in the routing block, a bearing in the routing block, an adjustable bell crank mounted in the bearing and engaging said head, ears projecting from the routing block, and pivotally attached to the end of an arm, arcuate slots in the ears, a bolt traversing the arcuate slots and the arm, a bed plate between the posts, the other end of the arm being slotted and adjustably supported on the bed plate.

8. In a woodworking machine, the combination of a swingingly mounted gear case, a plurality of working gears in the gear case, a bit stock attached to each working gear, a flexible and telescoping connection between the bit stock and the working gear, means to guide the bit stock at an angle inclined to the vertical, and means to impart a lateral movement to the bit stock, said last named means comprising a head slidably mounted for movement in lateral direction, a bell crank engaging the head with one arm, the other arm being extensible, a slotted bar engaging said other arm, an adjusting screw to vary the length of the slot in the bar, a rod, a ball and socket joint between the bar and the rod, said bar and rod being capable of acting as a single strut, a universal joint at the upper end of the rod, and a slotted and serrated rack extending from the universal joint to the gear case and being adjustably affixed to the back of the gear case.

In testimony whereof I affix my signature.

OSCAR PERRY DE REIGN.